(12) United States Patent
Fuwa et al.

(10) Patent No.: US 9,809,138 B2
(45) Date of Patent: Nov. 7, 2017

(54) SEAT DEVICE AND FRONT COVER

(71) Applicants: TACHI-S CO., LTD., Akishima-shi, Tokyo (JP); HONDA MOTOR CO., LTD., Minato-ku, Tokyo (JP); JOHNSON CONTROLS TECHNOLOGY COMPANY, Holland, MI (US)

(72) Inventors: Hirofumi Fuwa, Saitama (JP); Yusuke Ogata, Saitama (JP); Sugiaki Yamazato, Saitama (JP); Muneatsu Minato, Saitama (JP); Masakazu Koganei, Kanagawa (JP); Toshinari Mitsumoto, Tokyo (JP)

(73) Assignees: TACHI-S CO., LTD., Akishima-shi, Tokyo (JP); HONDA MOTOR CO., LTD., Tokyo (JP); JOHNSON CONTROLS TECHNOLOGY COMPANY, Holland, MI (US)

( * ) Notice: Subject to any disclaimer, the term of this patent is extended or adjusted under 35 U.S.C. 154(b) by 0 days.

(21) Appl. No.: 15/335,434

(22) Filed: Oct. 27, 2016

(65) Prior Publication Data
US 2017/0113585 A1    Apr. 27, 2017

(30) Foreign Application Priority Data
Oct. 27, 2015    (JP) .................................. 2015-210788

(51) Int. Cl.
*B60N 2/58*    (2006.01)
*B60N 2/70*    (2006.01)

(52) U.S. Cl.
CPC ......... *B60N 2/5825* (2013.01); *B60N 2/7094* (2013.01)

(58) Field of Classification Search
CPC ............................ B60N 2/5825; B60N 2/7094
USPC ..................................................... 297/228.12
See application file for complete search history.

(56) References Cited

U.S. PATENT DOCUMENTS

| | | | | |
|---|---|---|---|---|
| 3,278,226 A | * | 10/1966 | Magnusson ............ | A47C 27/15 297/228.12 |
| 7,275,786 B2 | * | 10/2007 | Kobayashi ............... | B60N 2/58 297/228.12 |
| 8,770,662 B2 | * | 7/2014 | Mount .................. | B60N 2/5825 297/228.12 |
| 2017/0066356 A1 | * | 3/2017 | Niwa ................... | B60N 2/7094 |

FOREIGN PATENT DOCUMENTS

JP    2009-040172 A    2/2009

* cited by examiner

*Primary Examiner* — Anthony D Barfield
(74) *Attorney, Agent, or Firm* — Shapiro, Gabor and Rosenberger, PLLC

(57) ABSTRACT

A seat device includes a seat part on which an occupant is seated, a support part for supporting the seat part, and a front cover made of soft material, which is fitted between front parts of the seat part and the support part. The front cover includes a seat connection end part joined with the front part of the seat part, a detachable first fixture attached to an end of the front cover opposite to the seat connection end part for attachment to the support part, an elastic member having one end disposed between the seat connection end part and the first fixture, and a detachable second fixture attached to the other end of the elastic member for attachment to a seat lower surface as a lower surface of the seat part.

10 Claims, 4 Drawing Sheets

SEAT DEVICE AND FRONT COVER

CLAIM OF PRIORITY

The present application claims priority from Japanese patent application JP2015-210788 filed on Oct. 27, 2015, the content of which is hereby incorporated by reference into this application.

BACKGROUND OF THE INVENTION

1. Field of the Invention

The present invention relates to a seat fitted with a cover at the lower part. More specifically, the present invention relates to a seat (seat device) for automobile, which is provided with a support part disposed at the lower part for supporting a seat part on which the occupant is seated, and a front cover for covering the space of the seat between the support part and the seat part.

2. Description of the Related Art

Generally, the front cover made of rigid resin such as plastic has been employed for the automotive seat as disclosed in Japanese Unexamined Patent Application Publication No. 2009-40172. Upon fitting of the front cover, it is necessary to reduce the gap between the seat part and the front cover for the purpose of improving the appearance, which may require much time and labor as well as many kinds of fixtures.

In the case where the side cover made of rigid resin such as plastic is disposed at the side of the seat part, it is difficult to achieve the appropriate fit state between the front cover and the side cover, thus requiring much time and labor for fitting as well as many kinds of fixtures.

SUMMARY OF THE INVENTION

The present invention is configured to overcome disadvantages of the generally employed structure, described on the background, by ensuring mitigation of the labor in fitting the front cover, and allowing suppression of slackening of the front cover.

The aforementioned object may be achieved by the present invention applied to the seat device configured as described below.

The seat device includes a seat part on which an occupant is seated, a support part for supporting the seat part, and a front cover made of soft material, which is fitted between a front part of the seat part and the support part. The front cover includes a seat connection end part joined with the front part of the seat part, a detachable first fixture attached to an end of the front cover opposite to the seat connection end part for attachment to the support part, an elastic member having one end disposed between the seat connection end part and the first fixture, and a detachable second fixture attached to the other end of the elastic member for attachment to a seat lower surface as a lower surface of the seat part.

Typically, the front cover according to the present invention is employed for a seat device which includes a seat part on which an occupant is seated, and a support part for supporting the seat part. The front cover made of soft material is disposed between a front part of the seat part and the support part, and includes a seat connection end part joined with the front part of the seat part, a detachable first fixture attached to an end of the front cover opposite to the seat connection end part for attachment to the support part, an elastic member having one end disposed between the seat connection end part and the first fixture, and a detachable second fixture attached to the other end of the elastic member for attachment to a seat lower surface as a lower surface of the seat part.

The above-described structure ensures to mitigate the time and labor for fitting the front cover, and to further suppress slackening of the front cover.

DETAILED DESCRIPTION OF THE PREFERRED EMBODIMENT

Embodiment

An embodiment according to the present invention will be described.

Figure 1:
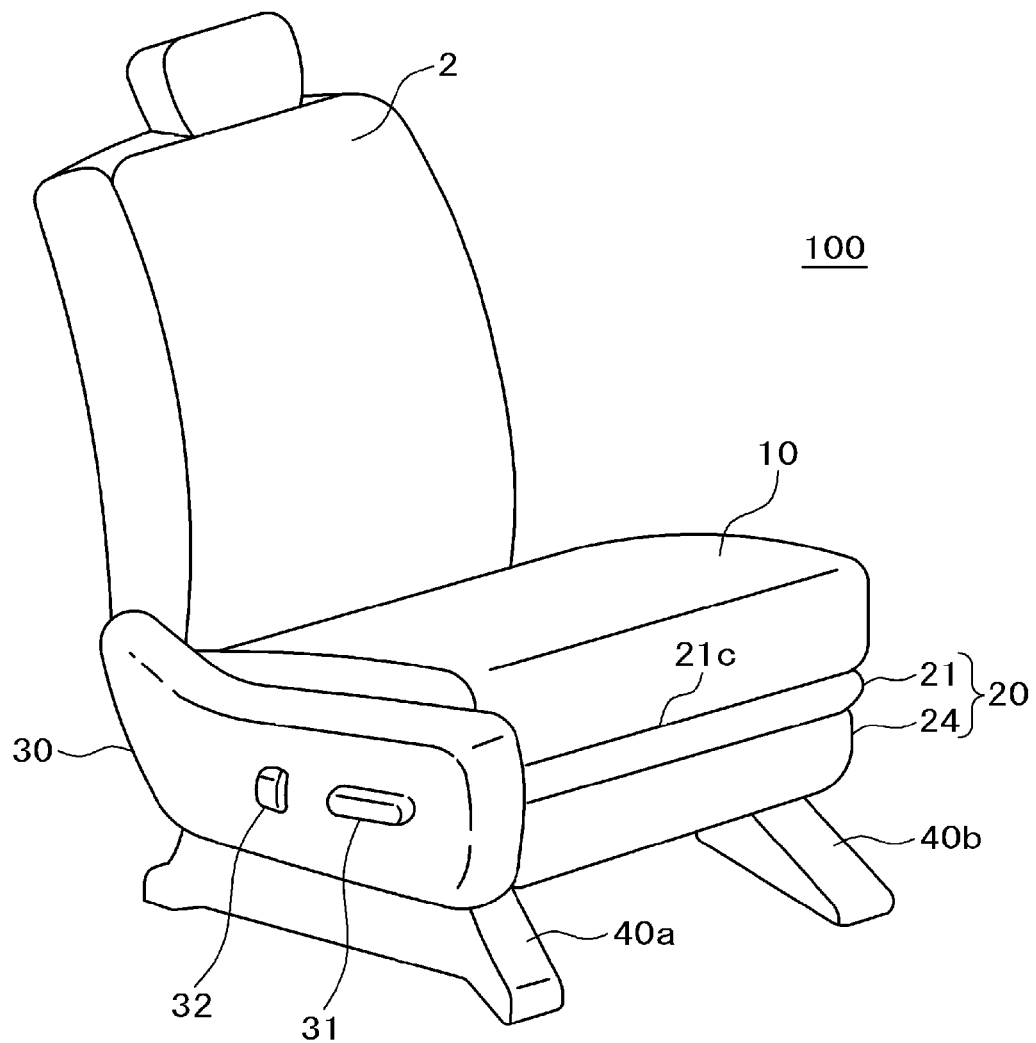
FIG. 1 is a perspective view of a seat device according to an embodiment of the present invention.

FIG. 1 is a perspective view of a seat device according to the present invention.

Referring to FIG. 1, a seat device 100 of the embodiment for automobile includes a seat part (seat cushion) 10 on which an occupant is seated, a support part for supporting the seat part 10, a front seat cover 20, and a seat back 2 as a backrest for the seated occupant. The seat part 10 having substantially a rectangular parallelepiped shape includes a seat surface on which the occupant is seated, a front surface, left and right side surfaces, and a lower surface 11 (see FIG. 3). FIG. 1 shows a right support part 40a and a left support part 40b which constitute the support part. The right support part 40a and the left support part 40b will be collectively referred to as the support part. The upper, lower, left, right, front, and rear directions may be defined based on the visual point of the occupant seated on the seat device 100.

The front cover 20 made of soft material, for example, flame retardant fabric is disposed between a front part of the seat part 10 and the support part. FIG. 1 shows an upper main part 21 and a lower main part 24 which constitute the front cover 20.

A side cover 30 for covering the right side of the seat part 10 is disposed to the right of the seat device 100. The side cover 30 is made of rigid resin, on which a seat adjustment switch 31 and a reclining switch 32 are disposed. The seat adjustment switch 31 is configured to allow the seated occupant to adjust height of the entire seat part 10 upward and downward, tilt the front part of the seat part 10 upward and downward, and adjust front-to-rear movement of the entire seat part 10 forward and rearward. The reclining switch 32 is configured to allow the seated occupant to perform the reclining operation by adjusting inclination of the seat back 2.

Upon height adjustment, the seated occupant will raise or lower a rear part of the seat adjustment switch 31. Upon tilting operation, the seated occupant will raise or lower a front part of the seat adjustment switch 31. Upon front-to-rear moving operation, the seated occupant will slide the seat adjustment switch 31 forward or rearward. Upon reclining operation, the seated occupant will tilt the reclining switch 32 forward or rearward.

There exist motors (not shown) and link mechanisms (not shown) inside the seat part 10 for the height adjustment, tilting operation, front-to-rear moving operation, and reclining operation. Since such motors and link mechanisms are known, explanation of those components will be omitted. Wirings for power supply to the motors, and connectors are disposed in the space between the lower part of the seat part 10 and the support part.

Figure 2:
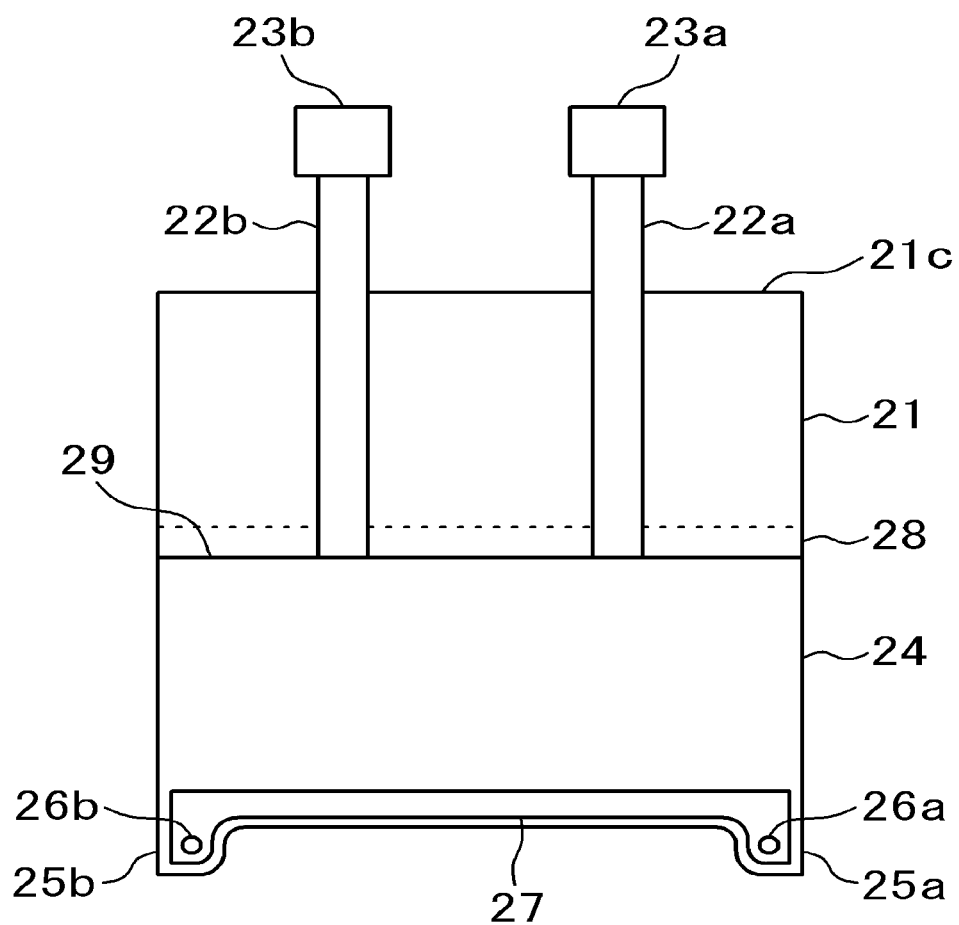
FIG. 2 is a development view of a front cover according to an embodiment of the present invention.
Figure 3:
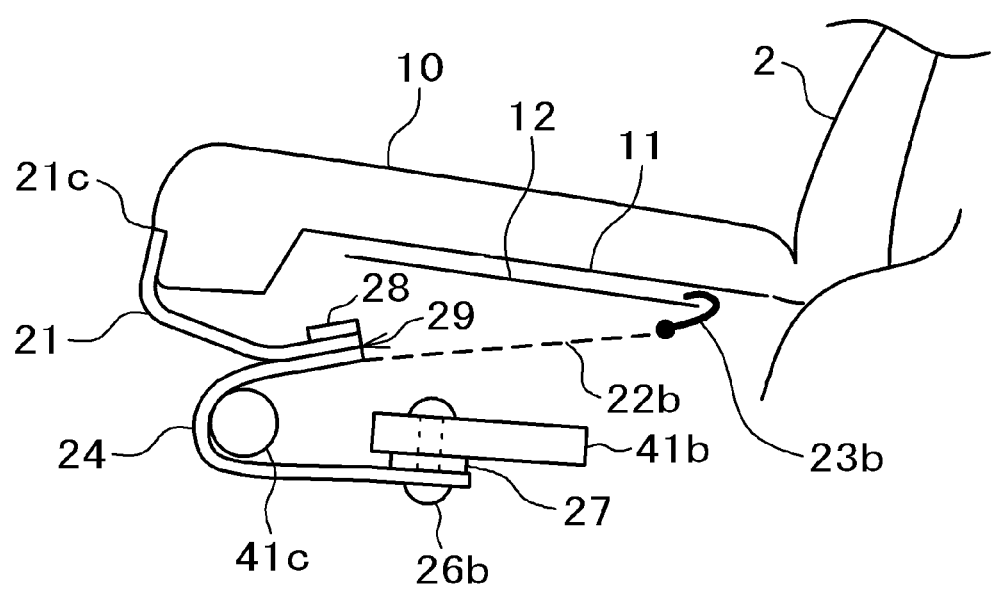
FIG. 3 is a vertical sectional view representing the state in which the front cover according to the embodiment of the present invention is fitted with the seat.
Figure 4:
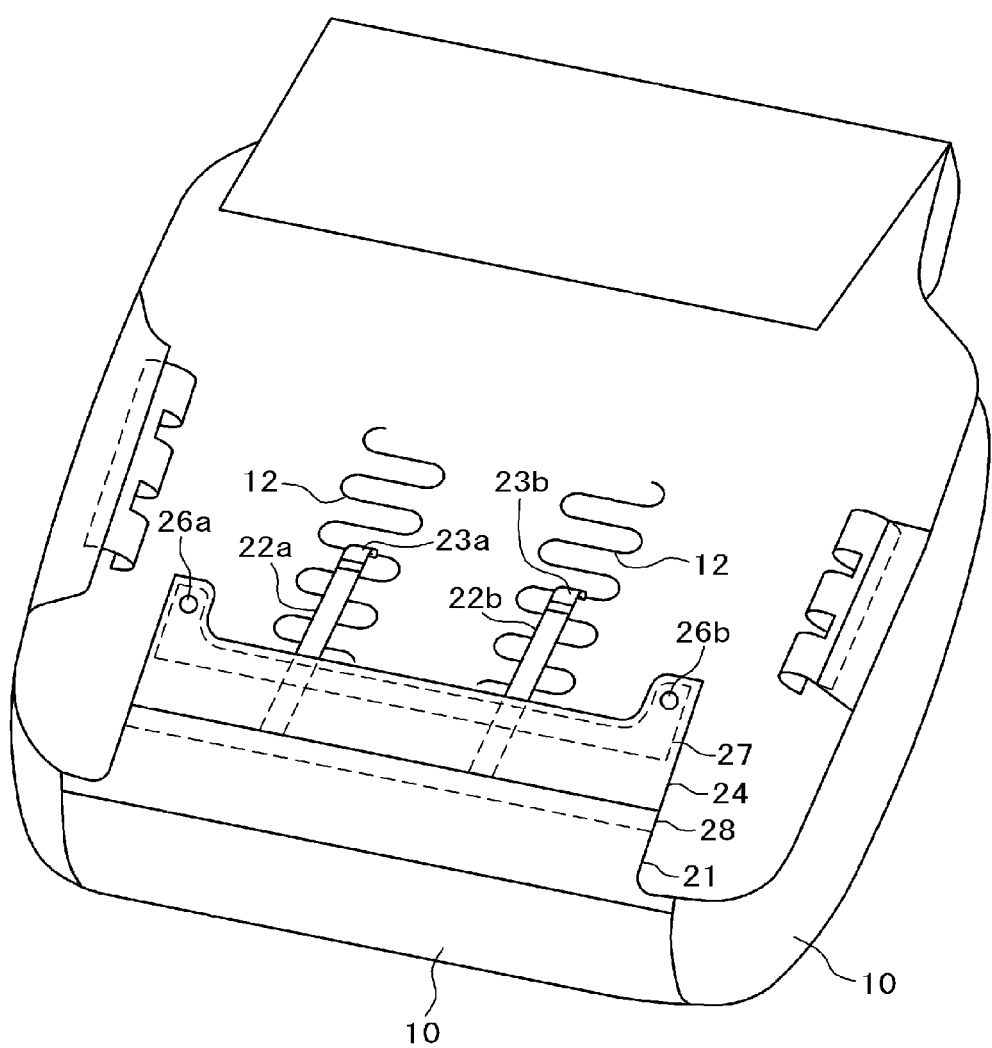
FIG. 4 is a perspective view of the seat device in a bottom view according to the embodiment of the present invention.

Referring to FIGS. 2 to 4, the front cover structure will be described in detail. FIG. 2 is a development view of the front cover of the embodiment according to the present invention. FIG. 3 is a vertical sectional view representing the state where the front cover of the embodiment according to the present invention is fitted with the seat part. FIG. 4 is a perspective view of the seat device of the embodiment according to the present invention when seen from below or bottom.

Referring to FIGS. 2 and 3, the front cover 20 is configured to include a seat connection end part 21c which is joined with the front part of the seat part 10, a first fixture which is positioned at an end of the front cover opposite to the seat connection end part 21c for fixation to the support part (left metal fitting 41b as shown in FIG. 3), an elastic member having one end disposed at the position between the seat connection end part 21c and the first fixture, and a second fixture which is positioned at the other end of the elastic member for attachment to the seat lower surface 11 as the lower surface of the seat part 10.

FIG. 2 shows a right first fixture 26a and a left first fixture 26b which constitute the first fixture, a right elastic member 22a and a left elastic member 22b which constitute the elastic member, and a right second fixture 23a and a left second fixture 23b which constitute the second fixture, respectively. The right first fixture 26a and the left first fixture 26b will be collectively referred to as the first fixture as required. The right elastic member 22a and the left elastic member 22b will be collectively referred to as the elastic member. The right second fixture 23a and the left second fixture 23b will be collectively referred to as the second fixture.

As FIG. 3 shows, the seat connection end part 21c is joined with the front part of the seat part 10 by using adhesive or sewing thread. The seat connection end part 21c is in the transversely extending linear form as an example of FIG. 2 shows. However, the seat connection end part may be curved to a slight degree. The term "transverse direction" refers to the horizontal direction from view point of the occupant seated on the seat part 10.

The first fixture is configured to removably or detachably fit the front cover 20 with the support part (left metal fitting 41b shown in FIG. 3) in the form of a clip (fastener) made of rigid plastic, for example. In the example of FIG. 3, the clip 26b as the left first fixture includes a head part and a fold-back part, and pierces upward through a first reinforcement member 27 and the left metal fitting 41b so that the fold-back part protrudes from the left metal fitting 41b. The head part and the fold-back part interpose the first reinforcement member 27 and the left metal fitting 41b for fastening. As described below, the first reinforcement member 27 may be made of such material as rigid polypropylene. The left metal fitting 41b may constitute a part of the left support part 40b.

Specifically, the support part includes a movable part (not shown) which can be moved in the front-to-rear direction, and an immovable part (not shown) which cannot be moved in the front-to-rear direction. The first fixture is fixed to the left metal fitting 41b which constitutes the movable part. The immovable part is fixed to the automobile frame, for example. The movable part slidably moves on the immovable part in the front-to-rear direction. The support part is made of metal, for example. It is also possible to use the rigid plastic for forming the support part.

The elastic member exhibits elasticity which allows expansion in the longitudinal direction (longitudinal direction as shown in FIG. 2) and contains rubber, for example. Referring to the example of FIG. 2, the elastic member includes the right elastic member 22a and the left elastic member 22b. One end of the elastic member is disposed between the seat connection end part 21c and the first fixture, and the other end of the elastic member is attached to the second fixture.

As FIG. 3 shows, the second fixture serves to removably or detachably fit the front cover 20 with the seat lower surface 11 as the lower surface of the seat part 10, which may serve as a hook (claw) made of rigid plastic. More specifically, the second fixture is attached to a cushion spring 12 disposed on the seat lower surface 11 through hooking.

As FIG. 2 shows, a plurality of second fixtures are provided. That is, two second fixtures (right second fixture 23a and left second fixture 23b) are disposed in the example of FIG. 2. The plurality of second fixtures may suppress slackening of the front cover 20 for improving aesthetic appearance.

The cushion spring 12 designed to impart the cushion function to the seat part 10 is corrugated and transversely planar shaped as shown in FIGS. 3 and 4. Attachment of the second fixture to the existing cushion spring 12 may eliminate the need of providing additional structures for attachment of the second fixture.

The front cover 20 includes a transversely extending boundary 29 between the seat connection end part 21c and the first fixture. The boundary 29 attached to the front cover 20 is positioned below the seat lower surface 11 to the rear of the seat connection end part 21c. That is, in the state where the hook 23b as the left second fixture is attached to the cushion spring 12, and the clip 26b as the left first fixture is attached to the left metal fitting 41b constituting the left support part 40b, the boundary 29 is kept tense rearward by the left elastic member 22b. FIG. 3 shows a cylindrical frame 41c that constitutes the support part. The transverse width of the frame 41c in the front view is substantially equal to the transverse width of the front cover 20.

Referring to FIG. 2, the upper main part 21 which constitutes the upper main part of the front cover 20 is defined by the seat connection end part 21c and the boundary 29. The lower main part 24 which constitutes the lower main part of the front cover 20 is defined by the end of the first fixture and the boundary 29. As FIG. 3 shows, the upper main part 21 and the lower main part 24 are viewable from the front. The boundary 29 may be formed as a folded part by sewing the upper main part 21 and the lower main part 24 together, or a folded part formed by folding the single piece of fabric into the upper main part 21 and the lower main part 24.

The transversely long first reinforcement member 27 for reinforcing the front cover 20 is formed at the end of the front cover at the first fixture side, which is more rigid than the main part (for example, fabric) of the front cover 20. The width of the first reinforcement member 27 in the front view is substantially equal to the width of the front cover 20 in the front view. As described above, the first reinforcement member 27 may be made of polypropylene, for example, and fixed to the front cover 20 through sewing with thread or using the adhesive.

The first reinforcement member 27 attached to the end of the first fixture allows suppression of slackening of the front cover 20, resulting in improved aesthetic appearance. As the width of the first reinforcement member 27 in the front view is substantially equal to that of the front cover 20, the slackening thereof may further be suppressed.

As the first reinforcement member 27 is disposed between the front cover 20 and the left metal fitting 41b (inner side of the front cover 20) as shown in FIG. 3, it is possible to prevent damage to the front cover 20 while being protected from friction against the left metal fitting 41b under vibration during traveling of the automobile. If the first reinforcement member 27 is disposed outside the front cover 20, it is possible to suppress slackening of the front cover 20. In this case, however, damage to the front cover 20 cannot be suppressed. It is therefore preferable to dispose the reinforcement member at the inner side of the front cover 20.

Referring to FIG. 2, a plurality of first fixtures are provided (two in the example shown in FIG. 2), each of which is a protrusion formed at an end of the front cover, opposite to the seat connection end part 21c. They are disposed on a plurality of corresponding protrusions extending in the direction opposite to the seat connection end part 21c. Referring to the example of FIG. 2, the two first fixtures (right first fixture 26a and left first fixture 26b) are disposed on the two protrusions (right protrusion 25a and left protrusion 25b), respectively. FIG. 2 shows the right protrusion 25a and the left protrusion 25b constituting the protrusion which will be collectively referred to.

Each of the plurality of first fixtures is disposed on the corresponding one of the plurality of protrusions. As the front cover 20 does not exist between the protrusions, the field for viewing the inside of the seat part 10 may be widened, and the work inside the seat part 10 may be facilitated compared with the structure with no protrusions. For example, the second fixture (hook) may be easily engaged with or disengaged from the cushion spring 12.

As FIGS. 2 and 3 show, a transversely extending second reinforcement member 28, which is more rigid than the main part (for example, fabric) of the front cover 20 is disposed at one end of the elastic member close to the boundary 29 for reinforcing the front cover 20. The width of the second reinforcement member 28 in the front view is substantially equal to the width of the front cover 20 in the front view. Likewise the first reinforcement member 27, the second reinforcement member 28 may be made of polypropylene, for example, and fixed to the front cover 20 through sewing with thread or using the adhesive.

As the second reinforcement member 28 is disposed on one end of the elastic member, slackening of the front cover is suppressed, resulting in improved aesthetic appearance. As the width of the second reinforcement member 28 in the front view is substantially equal to the width of the front cover 20, slackening of the front cover 20 may further be suppressed. Furthermore, the boundary 29 is constantly kept tense rearward, which may suppress slackening of the front cover 20, resulting in improved aesthetic appearance.

Instead of disposing the second reinforcement member 28 on the upper main part 21 of the front cover 20 as shown in FIG. 3, it is possible to dispose the second reinforcement member below the upper main part 21 (between the upper main part 21 and the lower main part 24), or below the lower main part 24. In the aforementioned arrangement, slackening of the front cover 20 may be suppressed. However, arrangement of the second reinforcement member between the upper main part 21 and the lower main part 24 may cause the second reinforcement member 28 viewable from the front. Therefore, it is preferable to avoid such arrangement.

The motion of the front cover 20 associated with vertical movement of the seat part 10 (height adjustment and tilting operation) will be described referring to FIG. 3. FIG. 3 shows the state where the front part of the seat part 10 is brought into the upper position as a result of the height adjustment or the tilting operation.

As FIG. 3 shows, the first fixture (left first fixture 26b shown in FIG. 3) of the front cover 20 is attached to the left metal fitting 41b which constitutes the movable part of the support part, and the second fixture (left second fixture 23b shown in FIG. 3) is hooked on the cushion spring 12 on the seat lower surface 11. It is possible to determine any one of the first and the second fixtures to be attached first. However, the work may be performed more easily if the second fixture linked with the elastic member is attached after attachment of the first fixture.

In the state as shown in FIG. 3, upon operation of the seat adjustment switch 31 on the side cover 30 by the seated occupant for lowering operation through height adjustment and tilting operation, at least the front part of the seat part 10 is lowered. In the state, however, the left metal fitting 41b which constitutes the movable part does not move in the vertical direction.

The distance between the front part of the seat part 10, that is, the seat connection end part 21c of the front cover 20, and the first fixture is reduced. This state may cause slackening of the front cover 20. However, as the boundary 29 of the front cover 20 is kept tense rearward by the elastic member, the slackening of the main part (upper main part 21 and the lower main part 24) of the front cover 20 viewable from the front may be suppressed.

Conversely in the case where the front part of the seat part 10 is brought into the lower position, upon operation of the seat adjustment switch 31 on the side cover 30 by the seated occupant for raising operation through height adjustment and tilting operation, the distance between the front part of the seat part 10 and the first fixture becomes long. As a result, the boundary 29 of the front cover 20 is pulled forward. In this case, as the boundary 29 has been kept tense by the elastic member, it may be easily moved forward without overstraining the motion of the front cover 20.

The aforementioned operation may be derived from attachment of the first fixture to the movable part (left metal fitting 41b) of the support part. In this case, however, the movable part is allowed only to slide in the front-to-rear direction. Therefore, the height adjustment and the tilting operation may be kept unchanged if such fixture is attached to the immovable part of the support part.

The explanation will be made referring to FIG. 3 with respect to the motion of the front cover 20 upon sliding movement of the seat part 10 in the front-to-rear direction. In this case, FIG. 3 shows the seat part 10 brought into either the lower or the upper position.

In the state as shown in FIG. 3 where the seated occupant operates the seat adjustment switch 31 on the side cover 30 for sliding movement in the front-to-rear direction, the left metal fitting 41b which constitutes the movable part slidably moves along with the seat part 10. However, the front part of the seat part 10 does not move in the vertical direction.

The distance between the front part of the seat part 10, that is, the seat connection end part 21c of the front cover 20, and the first fixture is kept unchanged. Therefore, no slackening occurs in the main part (the upper main part 21 and the lower main part 24) of the front cover 20 viewable from the front.

However, in the case where the first fixture is attached to the immovable part of the support part, the immovable part will be kept immobilized in spite of the sliding operation in the front-to-rear direction. Therefore, the distance between the seat connection end part 21c of the front cover 20 and the first fixture may vary. In the aforementioned case, deviation of the moving distance in the front-to-rear direction from the range that allows the elastic member to absorb the slackening may cause the risk of slackening of the front cover 20.

Therefore, it is preferable to dispose the first fixture on the movable part which slidably moves along with the seat part 10 so long as the slide operation function in the front-to-rear direction is available.

The embodiment provides advantageous effects at least as those to be described below.
- (A1) The front cover made of soft material includes a seat connection end part, a first fixture attached to the support part, an elastic member having one end interposed between the seat connection end part and the first fixture, and a second fixture disposed at the other end of the elastic member so as to be attached to the seat lower surface. The resultant cover may be configured simpler than the cover made of rigid resin like plastic, resulting in the reduced number of fixtures. It is also possible to reduce time and labor for fitting the front cover, reduce the weight, and further suppress slackening of the front cover viewable from the front. As the friction between the cover and the wiring disposed on the seat lower surface is lessened, the frictional damage to the wiring may be suppressed.
- (A2) The front cover has a transversely extending boundary between the seat connection end part and the first fixture, which is structured to be positioned below the seat lower surface to the rear of the seat connection end part. This ensures to further suppress slackening of the front cover viewable from the front.
- (A3) The front cover has a first reinforcement member at the end of the front cover at the first fixture side for reinforcement of the front cover. The first reinforcement member which is more rigid than the first cover, and formed into the transversely long shape ensures to further suppress slackening of the front cover viewable from the front.
- (A4) The first reinforcement member is configured to be interposed between the support part and the front cover so as to suppress damage from the support part to the front cover.
- (A5) The front cover has a second reinforcement member at the end of the front cover at the elastic member side for reinforcement of the front cover. The second reinforcement member which is more rigid than the front cover, and formed into the transversely long shape ensures to further suppress slackening of the front cover viewable from the front.
- (A6) The plurality of first fixtures are configured to be disposed on the plurality of protrusions correspondingly, which protrude from the end opposite to the seat connection end part. This ensures to sufficiently suppress slackening of the front cover viewable from the front, and widen the field for viewing the inside of the seat part as well as facilitate the work to be performed inside the seat part.
- (A7) The support part includes a movable part which can be moved in the front-to-rear direction and an immovable part which cannot be moved in the front-to-rear direction. As the first fixture is attached to the movable part, slackening of the front cover viewable from the front may be suppressed even if the seat part is moved in the front-to-rear direction.
- (A8) The second fixture is configured to be easily attached to the cushion spring exposed from the seat lower surface.
- (A9) The plurality of second fixtures ensure to further suppress slackening of the front cover viewable from the front.

Having been described with respect to the embodiment of the present invention in detail, it is to be understood that the present invention is not limited to the above-described embodiment but may be modified into various forms so long as it does not deviate from the scope of the present invention.

The seat for automobile has been described as the embodiment. However, the present invention is applicable to various types of seat (seat device) other than those for automotive use.

What is claimed is:
1. A seat device comprising:
a seat part on which an occupant is seated;
a support part for supporting the seat part; and
a front cover made of soft material, which is fitted between a front part of the seat part and the support part,
wherein the front cover includes:
a seat connection end part joined with the front part of the seat part,
a detachable first fixture attached to an end of the front cover opposite to the seat connection end part for attachment to the support part,
an elastic member having one end disposed between the seat connection end part and the first fixture, and
a detachable second fixture attached to the other end of the elastic member for attachment to a seat lower surface as a lower surface of the seat part.
2. The seat device according to claim 1,
wherein the front cover includes a transversely extending boundary between the seat connection end part and the first fixture, which is positioned below the seat lower surface to the rear of the seat connection end part.
3. The seat device according to claim 1,
wherein the front cover includes a first reinforcement member which is disposed at an end of the front cover at the first fixture side for reinforcement of the front cover, which is more rigid than the front cover, and which is formed into a transversely long shape.
4. The seat device according to claim 3,
wherein the first reinforcement member is interposed between the support part and the front cover.
5. The seat device according to claim 1,
wherein the front cover includes a second reinforcement member which is disposed at the one end of the elastic member for reinforcement of the front cover, which is more rigid than the front cover, and which is formed into a transversely long shape.
6. The seat device according to claim 1,
wherein a plurality of first fixtures are respectively disposed on corresponding protrusions which protrude from the other end opposite to the seat connection end part in a direction opposite thereto.
7. The seat device according to claim 1,
wherein the support part includes:
a movable part which is allowed to move in a front-to-rear direction, and an immovable part which is not allowed to move in the front-to-rear direction, and wherein the first fixture is attached to the movable part.

8. The seat device according to claim 1, wherein the second fixture is attached to a cushion spring exposed from the seat lower surface.

9. The seat device according to claim 1, wherein a plurality of second fixtures are provided.

10. A front cover for a seat device which includes a seat part on which an occupant is seated, and a support part for supporting the seat part, wherein the front cover made of soft material is disposed between a front part of the seat part and the support part, and includes:

a seat connection end part joined with the front part of the seat part, a detachable first fixture attached to an end of the front cover opposite to the seat connection end part for attachment to the support part, an elastic member having one end disposed between the seat connection end part and the first fixture, and a detachable second fixture attached to the other end of the elastic member for attachment to a seat lower surface as a lower surface of the seat part.

* * * * *